United States Patent

Durina et al.

[11] Patent Number: 5,816,698
[45] Date of Patent: Oct. 6, 1998

[54] SCREW AND PLASTICATING APPARATUS AND METHOD

[75] Inventors: Michael F. Durina, Poland, Ohio; Timothy W. Womer, Edinburg, Pa.; Michael J. Senediak, Youngstown, Ohio

[73] Assignee: Spirex Corporation, Youngstown, Ohio

[21] Appl. No.: 631,953

[22] Filed: Apr. 15, 1996

[51] Int. Cl.$^6$ ....................................................... B29B 7/42
[52] U.S. Cl. ............................... 366/81; 366/90; 366/319; 366/324
[58] Field of Search .................................. 366/79, 81, 88, 366/89, 90, 98, 99, 318, 319, 322, 323, 324

[56] References Cited

U.S. PATENT DOCUMENTS

| 2,669,750 | 2/1954 | Keeney | 366/89 |
|---|---|---|---|
| 2,753,595 | 7/1956 | Dulmage . | |
| 3,006,029 | 10/1961 | Saxton . | |
| 3,652,064 | 3/1972 | Lehnen et al. . | |
| 3,701,512 | 10/1972 | Schippers et al. | 366/89 |
| 3,941,535 | 3/1976 | Street . | |
| 4,085,461 | 4/1978 | Maillefer . | |
| 4,178,104 | 12/1979 | Menges et al. | 366/90 |
| 4,201,481 | 5/1980 | Iddon et al. . | |
| 4,215,978 | 8/1980 | Takayama et al. . | |
| 4,227,870 | 10/1980 | Kim . | |
| 4,277,182 | 7/1981 | Kruder . | |
| 4,405,239 | 9/1983 | Chung et al. . | |
| 4,752,136 | 6/1988 | Colby . | |
| 4,896,969 | 1/1990 | Dray | 366/88 |
| 4,981,364 | 1/1991 | Geyer | 366/88 |
| 5,044,759 | 9/1991 | Gagliani | 366/90 |
| 5,215,764 | 6/1993 | Davis et al. . | |
| 5,318,357 | 6/1994 | Colby et al. | 366/90 |
| 5,318,358 | 6/1994 | Wobbe et al. | 366/90 |

OTHER PUBLICATIONS

C. Rauwendall, "How to Improve Mixing in Single–Screw Extruders", *Plastics World*, Nov. 1990.

*Primary Examiner*—Tony G. Soohoo
*Attorney, Agent, or Firm*—Robert J. Herberger, Esquire

[57] ABSTRACT

A plasticating apparatus including a rotating screw having a helical flight disposed within and cooperating with the inner wall of a heated barrel. Solid resinous material is introduced to a helical valley extending between said flight to be heated and plasticized by said apparatus while being advanced towards an outlet opening by the rotation of said screw. The screw has a meter section for working, melting and mixing said resinous material at high temperatures. The bottom surface of the helical valley in said metering section is divided into side by side relatively shallow and relatively deep levels. Within the metering section is a transit channel having a reverse helical direction as compared with the helical direction of the flight. Because of the reverse helical direction of the transit channel, the transit channel intersects the helical flight and helical valley with the transit channel cutting therethrough. During operation, the level differential between the shallow and deep levels induces a continuous tumbling and mixing action upon the molten resin while the transit channel allows portions of the molten resin to back flow and recirculate through the mixing section.

14 Claims, 2 Drawing Sheets

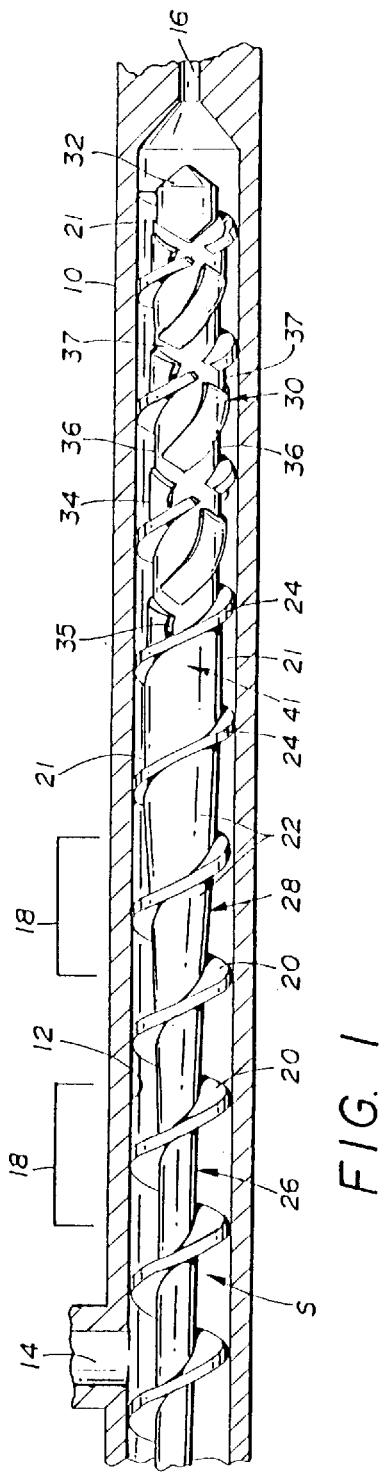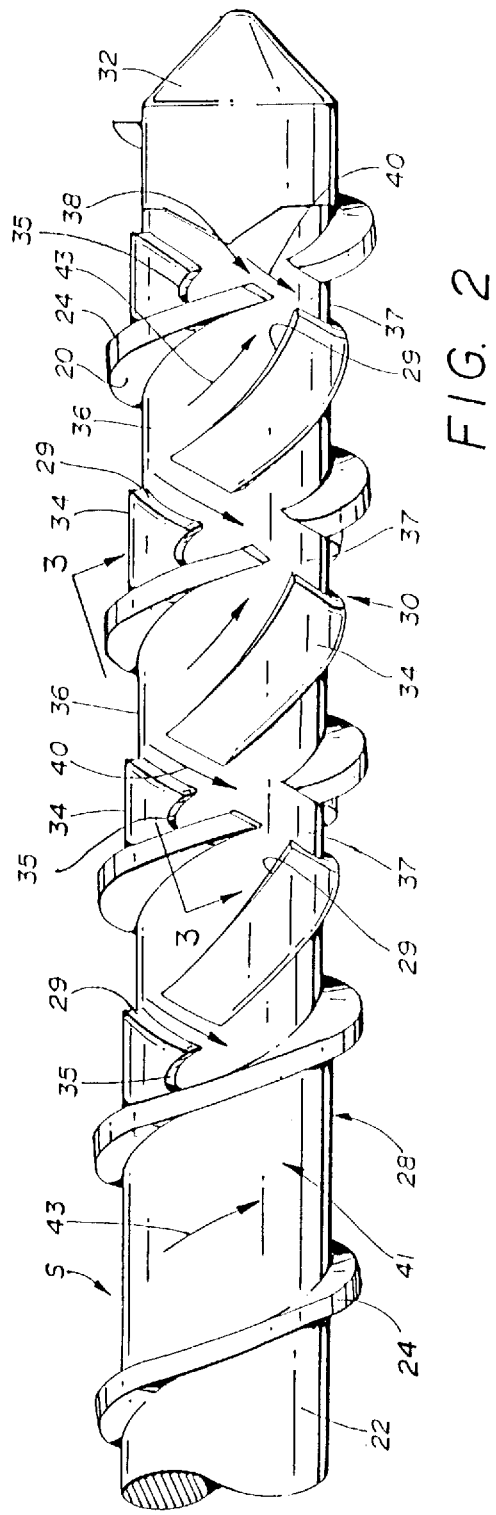

SCREW AND PLASTICATING APPARATUS AND METHOD

FIELD OF INVENTION

This invention relates to extruders and injection machines of the type in which a screw rotatable within a barrel is employed to extrude or inject molten resinous material to the outlet port of the plasticating barrel. More particularly, this invention is concerned with thorough mixing and melting resinous material in the metering section.

BACKGROUND OF THE INVENTION

Plasticating equipment commonly used today are of the type which receive polymer pellets or powder, heat and work the polymer to convert it into a melted or molten state before delivering the molten polymer under pressure through a restricted outlet or discharge port. Although there are several different types of plastic polymers each having different physical properties, it is desirable that the extrudate leaving the typical plasticating equipment be fully melted, homogeneously mixed and uniform in temperature, viscosity, color and composition.

The plasticating apparatus includes an elongated cylindrical barrel which may be heated at various locations along its length and a screw which extends longitudinally through the barrel. The screw has a core with a helical flight thereon and the flight cooperates with the cylindrical inner surface of the barrel to define a helical valley for passage of the resin to the plasticating apparatus outlet port.

Although there are different screw configurations for different polymer compositions, the typical plasticating screw ordinarily has a plurality of sections along its extended axis with each section being designed for a particular function. Ordinarily, there is a feed section, a transition section and a metering section in series. The plasticating screw feed section extends beneath and forward from a feed opening where a polymer in pellet, powder or regrind form is introduced into the plasticating apparatus to be carried forward along the inside of the barrel. The depth of helical flight of the screw in the feed section is usually large enough to overfeed the solid polymer. The overfeeding action serves to compact and pressurize the polymer particles and form a solid bed of advancing material in the plasticating apparatus.

The material is then worked and heated in the transition section so that melting of the polymer occurs as the material is moved forward along the screw toward the outlet port. Most of the melting occurs in the transition section near the barrel surface at the interface between a thin melt film and solid bed of polymer. As disclosed in U.S. Pat. No. 4,752,136, the general advancing pattern persists until a substantial portion of the polymer reaches the molten state.

The transition section leads to the metering section which has a shallower root depth helical passageway. The metering section as one of its intended functions provides a constant flow of molten polymer toward the outlet port. In addition, the metering section must melt any unmelted solids and mix the molten polymer into a homogeneous and uniform composite.

As previously stated and as described in U.S. Pat. No. 4,752,136, the root depth of the metering section is generally shallow. This increases the shear and friction in the polymer which has a tendency to raise the temperature of the polymer. The temperature rise may induce thermal degradation of the molten polymer as it passes through the metering section unless mixing is induced. Further, increase in shear rate and temperature usually has marked effects on the viscosity of the polymer. A change in viscosity of the material being plasticated in turn affects the flow rate of the material through the restricted outlet port. As a result, without the optimum screw configuration, there may be a failure to achieve the desired uniformity and output rate of molten polymer which is a significant problem for the plasticating operation.

Although an increase in passageway root depth of the metering section has an opposite effect upon the temperature of the material, it reduces the mixing and uniformity in the molten resin. To overcome this problem, U.S. Pat. No. 4,752,136, discloses a metering section defined by relatively shallow and relatively deep levels extending in side by side helical paths having a depth differential therebetween. The deep level or groove constitutes a channel extending along side the shallow level. The helical paths have the same pitch as each other but have a pitch different than the pitch of the helical flight. Further, the depth of the helical paths is substantially uniform in the metering section. The material in the molten state continuously passes in tumble mixing flow between said relatively shallow and deep levels.

Although this configuration satisfies many of the general needs, thermal and composite mixing can be improved even more for various polymer materials by having a screw configuration with a metering section that allows for a continuous back flow of portions of the molten material. The back flow of molten material gets recirculated through portions of the mixing section and is remixed with newly advancing molten resin, thereby further assuring the uniformity of the composition, viscosity, color and temperature of the molten resin leaving the extruder.

SUMMARY OF THE INVENTION

The present invention is directed to a screw configuration, plasticating apparatus and method for improving mixing and melting of resin material in the metering section. In accordance with this invention, in the metering section a transit channel extends in a reverse helical direction in relation to the helical flight, thereby continuously intersecting and cutting through the helical flight and helical paths. The transit cut-through channel allows for the back flow of portions of the molten material to be recycled or recirculated back through the mixing section thereby enhancing its functionality.

Generally, the depth of the transit channel is greater than the depth of the shallow level of the helical path. Further, the width of the transit is between about 1.25 and 0.75 times the width of the deep level of the helical path although it may be greater or smaller thereto depending on other factors such as the length of the metering section, the diameter of the screw and the resin composite. The pitch of the transit channel generally remains substantially constant and is in the reverse direction as compared with the helical flight.

In terms of the method, the present invention relates to plasticating resinous material in a molten state under pressure by feeding resinous material in a solid state to the feed section of a plasticating screw. As the screw is rotated in a cylindrical barrel having an inner surface, the flight of the screw and the inner surface cooperate to move resin material along a helical path toward the outlet port. In the transition section, heat is applied to the barrel which transfers to the material while working the material between the barrel and the screw. As a result, the material is converted into a molten state with some unmelted particles.

The flow of material is then passed to the metering section which is shallower than the transition section. The metering section having a helical valley defined by the helical flight. As previously stated, in this invention the bottom surface of the valley in the metering section is defined by relatively shallow and relatively deep levels extending in side by side helical paths having a depth differential therebetween. A back flow transit channel cuts through in a reverse helical direction as compared with the helical flight. The transit channel intersects with and cuts through the helical flight and helical paths in a reverse back feed direction. As the molten material is advanced by the helical flight, a reverse flow of molten material occurs through the transit channel, thereby recirculating portions of molten material which enhances the mixing action within the metering section.

DESCRIPTION OF THE DRAWINGS

FIG. 1 shows a plasticating apparatus having a cylindrical barrel and a screw disposed within;

FIG. 2 shows an enlarged view of the metering section of the screw of FIG. 1;

DESCRIPTION OF THE PREFERRED EMBODIMENT

Figure 4:
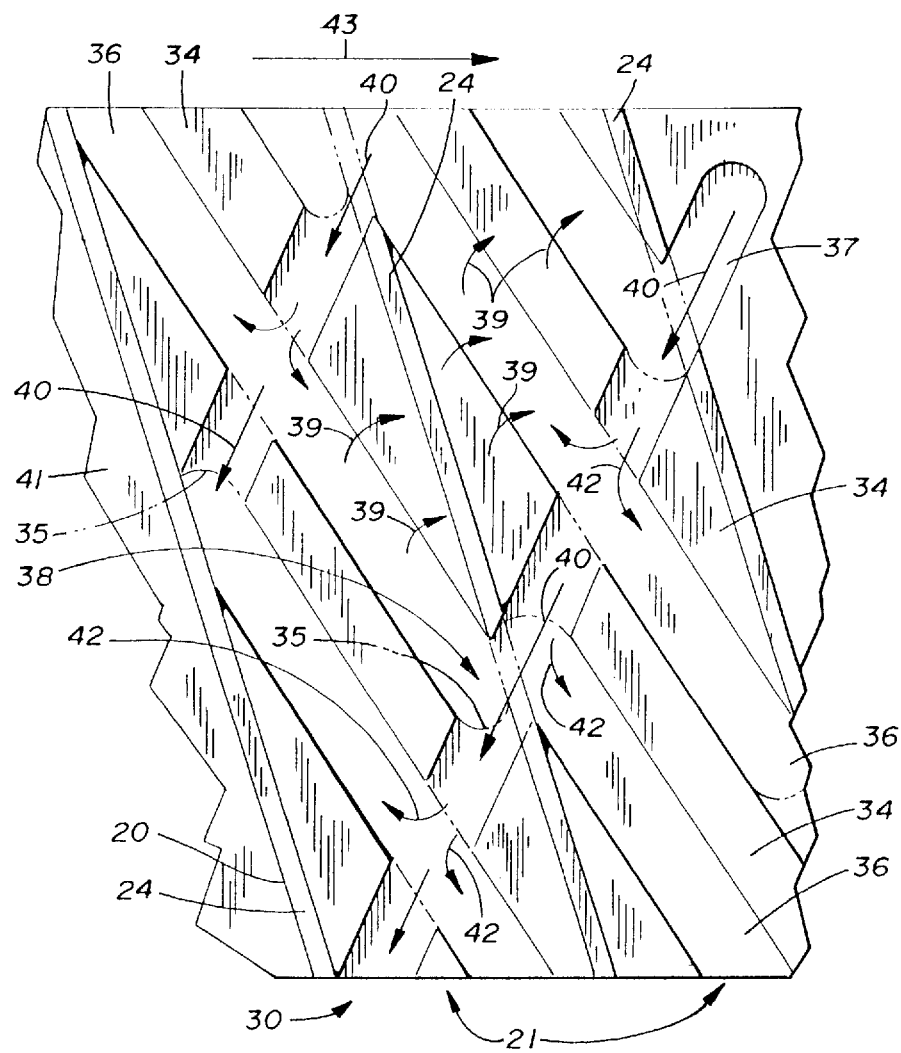
FIG. 4 illustrates the backward flow mixing action occurring in the metering section and the forward tumbling and mixing action occurring between the shallow and deep levels of the helical paths.

Referring to FIG. 1, a plasticating screw apparatus can be seen including a cylindrical barrel 10 having a cylindrical inner lining surface 12. The barrel 10 is provided with inlet port 14 for the admission of one or more solid particulate resinous materials and any required additives or agents. The barrel 10 is also provided with a discharge port 16 for the discharge of plasticated molten extrudate. Any conventional heating means 18 can be provided on the outside of the barrel 10 for applying heat to the barrel 10.

Within the barrel 10 is a screw S which is rotated by means not shown. The screw S includes a single helical flight 20 winding around a core 22. The flight 20 includes flight land 24 which moves in close cooperative association with respect to inner surface 12 of the barrel 10. The axial distance between comparable points on the adjacent flights represents the pitch of the flight.

The flight 20 defines a helical valley 21 bounded by flight 20, inner surface 12 of the barrel 10 and the surface of the core 22. The surface of the valley 21 on the core 22 is the root of the valley. The screw S includes a relatively deep root feed section 26 for the admission, heating, working and conveying of solid resin, a transition section 28 of reducing depth to adapt to the reduced volume of resin due to the elimination of air spaces between the solid particles, and a relatively shallow root metering section 30 wherein the resin is predominantly in a molten state with some amount of solid particles remaining. A discharge cone or valve 32 is generally employed at the downstream end of the metering section 30.

Figure 3:
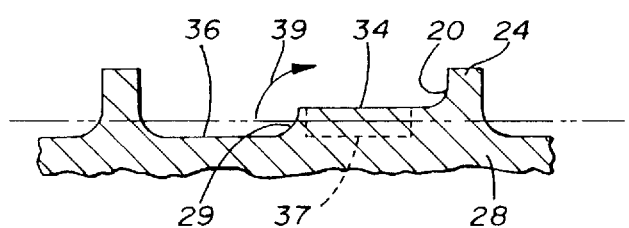
FIG. 3 is an enlarged cross-section of lines 3—3 of FIG. 2.

Referring to FIGS. 2 and 3, the bottom surface of the root of the helical valley 21 in the metering section 30 includes a relatively shallow level 34 and a relatively deep level 36. Levels 34 and 36 each constitutes helical pathways in the valley 21. The deep level 36 constitutes a helical channel extending alongside shallow level 34. The width of shallow and deep levels 34 and 36 are preferably about equal. Shallow level 34 and deep level 36 each is flat and has a substantial uniform depth along the metering section 30. The shallow level 34 and deep level 36 extend in side by side or adjacent helical paths having the same pitch as each other but having a different pitch than the pitch of the helical flight 20. The pitch of the helical paths can be smaller or larger than the pitch of the helical flight 20. However, preferably the pitch of the helical paths is between about 1.25 and 3 times the pitch of the helical flight 20. As an alternative, the pitch of the helical paths is between about 0.3 and 0.8 times the pitch of the helical flight 20. Because the helical paths have a different pitch than the pitch of the flight 20, the helical paths and flight 20 cross each other. Therefore, the flight 20 periodically interrupts the helical paths.

The depth differential between the shallow level 34 and deep level 36 is bridged by a descending or ascending shoulder 29 without any intervening barrel flight or obstruction so that there is unimpeded flow between the two levels. The depth of the deep level 36 is preferably between about 1.5 and 3 times the depth of the shallow level 34 measured from inner cylindrical surface 12, although depths below and above the ratio are acceptable.

A single continuous transit cut-through channel 37 extends through the metering section 30 in a helical direction which is reverse of the helical direction of flight 20. The transit channel 37 is of a depth substantially equal to that of the relatively deep channel 36 in the bottom surface of the helical valley 21, although a tapered depth, as well as depths below and above the depth of the deep channel 36, are acceptable. The transit channel 37 can have a pitch smaller or larger than the pitch of the helical flight 20 although in the opposite direction as previously stated and as best seen in FIG. 2. More specifically, the pitch of the transit channel 37 is generally between the range of about 0.75 to 3 times the pitch of the helical flight 20 with the more preferable range being between 1.5 and 2 times the pitch of the helical flight 20. Accordingly, the sides of the transit channel 37 is defined by the intersecting cross lengths of the shallow level 34 of the helical paths and the intersecting cross lengths of the helical flight 20.

Since the helical paths have a different pitch than the pitch of the flight 20, as previously described, the helical paths and flight 20 cross each other at an angle thereby forming a pocket 35 between each intersecting shallow level 34 and helical flight 20. The pocket 35 is on the side of the intersecting shallow level 34 having the smaller angle with the helical flight 20. It is most preferable in this invention although not essential, that the pitch of the transit channel 37 cuts through the helical flight 20 at the intersecting pockets 35 while keeping the pitch of the transit channel 37 within the preferred range between 1.5 and 2 times the pitch of the helical flight 20. FIG. 2 shows the transit channel 37 cutting through one of the pockets 35 in each helical path and FIG. 4 shows the transit channel 37 cutting through both pockets 35 in each helical path [shown in broken lines].

FIG. 4 is a design diagram indicating the effect upon the molten resin caused by the progressive change in root level of the helical path and the intersection of the transit channel 37. Arrow 43 indicates the directional flow of the resin material by the helical flight 20. Since the pitch of side by side helical paths 34 and 36 is different than the pitch of the helical flight 20, the advancing change in root levels causes the molten resin to experience a massaging effect as it is forced along valley 21 by helical flight 20 as shown by the mixing arrows 39. Periodically, the progressively forward tumbling and massaging of the molten resin is interrupted as it comes within the path of the transit channel 37. While in the transit channel 37, the molten resin retracts in the reverse direction away from the outlet port 16 and opposite of the resin flow 43. As stated, the back pressure in the transit channel 37 forces the molten resin in a reverse direction until it is again forced forward by the helical flight 20 or shoulder 29 of the shallow level 34.

To explain in more detail, from the area of the discharge cone 32 molten resin is forced through the transit channel 37 creating back pressure in the reverse direction along transit channel 37 as indicated by directional flow arrows 40 shown in FIG. 4. As flow dynamics increase, a tributary flow pattern is achieved indicated by multiple directional flow arrows 42 in which molten resin is forced to recirculate within the metering section 30. As molten material is forced by the screw through the discharge port 16, new material is added into the metering section from the transition section at 41.

As set forth in applicant's U.S. Pat. No. 4,752,136, the mixing indicated by arrows 39 between the shallow level 34 and deep level 36 causing a massaging effect to the molten resin imparting turbulence to an otherwise linear flow stream. As previously stated, the transit channel 37 of the present invention introduces reverse directional flow as shown by arrows 40 and 42 in FIG. 4. As a result, the mixing within the metering section 30 is enhanced by redistributing or recirculating molten material back through the mixing section by the tributary flow action as hereinbefore described creating a more chaotic mixing effect.

It will thus be seen that a new and useful screw, plasticating apparatus and method have been illustrated and described. It will be apparent to those skilled in the art that various changes or modifications may be made to the invention without departing from the spirit thereof.

We claim:

1. A plasticating apparatus of the type wherein a rotating screw having a helical flight is disposed within and cooperates with an inner wall of a heatable barrel having inlet and outlet openings, and whereby particles of resinous material are introduced through said inlet opening to a helical valley extending along said flight to be plasticated by said screw and advanced towards said outlet opening, the improvement comprising said screw comprising a metering section for working said resinous material at high temperature, the bottom surface of said helical valley in said metering section being divided into side by side relatively shallow and relatively deep levels having a depth differential therebetween, said relatively shallow and relatively deep levels extending along the bottom surface of said valley in side by side helical paths, said side by side helical paths having a different pitch than the pitch of said helical flight, said depth differential between said shallow and deep levels being connected by a descending-ascending shoulder without any intervening barrier flight, a continuous transit channel in said metering section having a reverse helical direction in relation to the helical direction of the helical flight and wherein said transit channel intersects and cuts through said helical flight, said transit channel having a substantially uniform width.

2. A plasticating apparatus of claim 1 wherein in the metering section the pitch of said transit channel is between about 1.5 and 2 times the pitch of said helical flight.

3. A plasticating apparatus of claim 1 wherein in the metering section the width of said transit channel is substantially uniform and the width of said transit channel is between about 1.25 and 0.75 times the average width of the deep level.

4. A plasticating apparatus of claim 1 wherein in the metering section the depth of said shallow and deep levels remain substantially uniform and the depth of the transit channel has a depth greater than the depth of the shallow level so that the transit channel cuts through the shallow level of the helical paths.

5. A plasticating apparatus including a rotating screw within a heatable barrel having inlet and outlet openings, said screw comprising a single helical flight defining a helical valley extending along said flight directed towards said outlet opening, said screw having a metering section for working resin material at high temperature, the helical valley within said metering section being divided into side by side helical paths with each path having a relatively shallow level and a relatively deep level with a depth differential therebetween, said metering section having a continuous transit channel with a reverse helical direction in relation to the helical direction of said flight, the path of said transit channel continuously intersecting and cutting through said helical flight and helical paths thereby permitting molten resin material in said transit channel to pass through the helical flight away from said outlet opening.

6. The plasticating apparatus of claim 5 wherein in the metering section the depth of said relatively shallow level and said relatively deep level remaining substantially uniform, said transit channel having an average depth greater than the depth of the shallow level, each shallow level intersecting the helical flight forming a pocket therebetween.

7. A screw for a plasticating apparatus, the plasticating apparatus having a heatable barrel with an inner wall and inlet and output ports, the screw comprising:
  a) a helical flight which cooperates with the inner wall of said heated barrel;
  b) a helical valley extending along said flight;
  c) said screw having a metering section for working resinous material at high temperature, the bottom surface of said helical valley in said metering section having a groove relatively deeper than said valley so that there is a depth differential between the bottom of the groove and said bottom surface of said valley, said channel extending in a helical path through said valley bottom surface;
  d) said helical path having a different pitch than the pitch of said helical flight so that the helical flight periodically interrupts said helical path; and
  e) a transit channel in said metering section having a reverse helical direction in relation to the helical direction of the helical flight, said transit channel continuously cutting through said helical flight and helical valley at intersections with said transit channel so that portions of molten resinous material in the transit channel can flow through the helical flight and helical valley.

8. The screw of claim 7 wherein in the metering section the pitch of said transit channel is at least 0.75 times the pitch of said helical flight.

9. The screw of claim 7 wherein in the metering section the depth of said transit channel is substantially uniform and at least 0.75 times the width of the groove in the helical valley.

10. The screw of claim 7 wherein in the metering section the depth of said bottom surface of the valley is substantially uniform and the depth of the transit channel is greater than the depth of said bottom surface of said valley.

11. The screw of claim 7 wherein in the metering section the depth of said bottom surface of the groove is substantially uniform and the depth of the transit channel is substantially equal to the depth of said bottom surface of said groove.

12. A process of plasticating resinous material in a molten state under pressure comprising:
  a) feeding solid resinous material to a rotating screw in a barrel having a cylindrical inner surface, said screw having a helical flight with said flight cooperating with said inner surface to move said material along a helical path;
  b) applying heat to said barrel and said material while working the material between the barrel and the screw to convert the solid material to a molten state with only a minor amount of unmelted particles;
  c) passing said molten material through a metering section having a helical valley defined by said helical flight, the bottom surface of said helical valley defined by a relatively shallow level and relatively deep level extending in side by side helical paths having a depth differential therebetween, said helical valley and helical flight being periodically interrupted by a transit channel having a reverse helical direction in relation to the helical direction of the helical flight, said transit channel passing through said helical flight and valley;
  d) portion of said molten material in the metering section is continuously and unobstructively advanced by the helical flight toward the outlet port, said advancing portion of molten material mixing by passing between said relatively shallow and deep levels with some of said molten material passing into the transit channel and regressing from the advancing stream thereby being recirculated through the mixing section.

13. The process of claim 12 wherein in the metering section the depth of the shallow level, deep level and transit channel each being substantially uniform.

14. The process of claim 12 wherein in the metering section the width of said transit channel is substantially uniform and at least 0.75 times the width of the deep level in the helical valley.

* * * * *